J. H. DREYER.
Composition for and Construction of Pickling-Vats.
No. 217,205. Patented July 8, 1879.
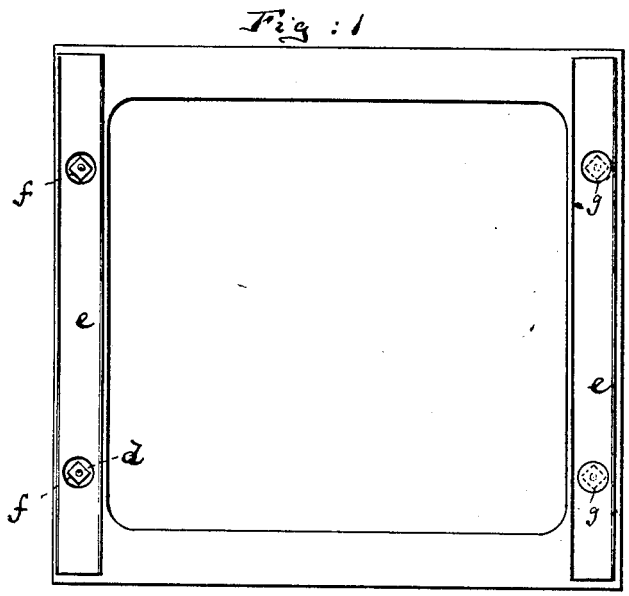
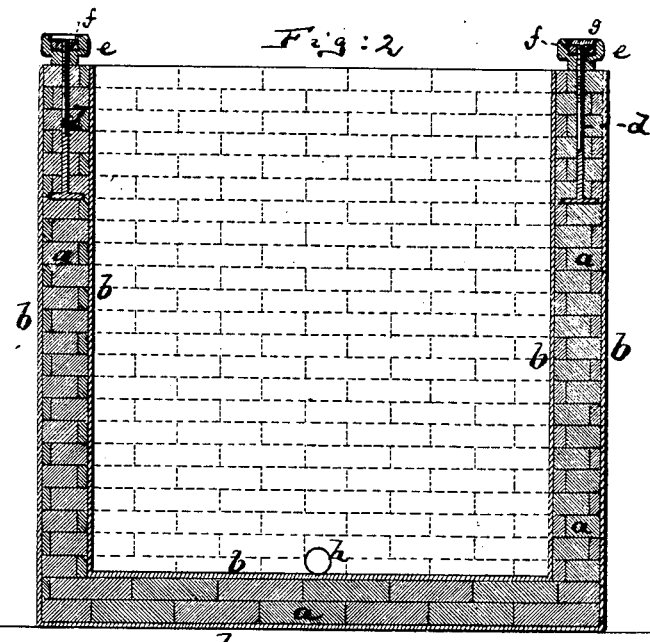

United States Patent Office.

JOHANN H. DREYER, OF NEW YORK, N. Y., ASSIGNOR TO CHARLES KOSTER, OF SAME PLACE.

IMPROVEMENT IN COMPOSITIONS FOR AND CONSTRUCTION OF PICKLING-VATS.

Specification forming part of Letters Patent No. 217,205, dated July 8, 1879; application filed June 4, 1879.

*To all whom it may concern:*

Be it known that I, JOHANN HERMANN DREYER, of New York, in the county and State of New York, have invented a new and Improved Composition for and Construction of Pickling-Vats, of which the following is a specification.

Figure 1 is a plan or top view of my improved pickling-vat, and Fig. 2 a vertical central section of the same.

Similar letters of reference indicate corresponding parts in all the figures.

This invention relates to a new construction of vat used for pickling meats preparatory to smoking them. Heretofore such meats have been usually pickled in casks or barrels, wherein they were retained for a proper length of time, and from which they were subsequently removed to be smoked; but experience has shown that the ordinary casks or barrels do not constitute sufficient non-conductors of heat to properly preserve the meats in the warmer season, inasmuch as the meats to be smoked are not pickled to the same extent as those which are to be brought into market in the pickled condition only. In other words, the preparation in which the meat is contained does not suffice to prevent decomposition during the hot season. My invention seeks to provide a vat in which the meat will be held and preserved free from danger of decomposition even during the heated season, and by the use of which large sums of money which are now expended for ice and other preservatives will be economized, though, of course, ice may also be used around my improved vat. The vat may also be used for other purposes than those of containing pickled meats—for example, in breweries, ice-houses, &c.

My invention consists, first, in a new composition for the blocks of which the vat is constructed; and, second, in the new construction of vat, which is provided with locking-pieces at the top, and protected against the injurious effects of acids in all respects, as hereinafter more fully described.

The vat shown in the drawings is built up of series of bricks or blocks, *a a*, which are laid or placed to constitute the bottom and the upright walls of the vat, in manner shown.

Where series of vats are to be used in the same structure, I prefer to make them contiguous, so that the wall of one will also be that of the other—in other words, so that the upright walls will be partitions between two adjoining vats placed in one row.

The blocks *a* are constructed as follows: I mix about one part of Portland cement with about three parts of coal-ashes and about one part of mineral wool. These ingredients are put together with the assistance of sufficient water to render them plastic, and are then laid to dry and set in a suitable mold to produce the required blocks. The blocks thus made are non-conductors of heat, better, in fact, than any known to me, and therefore particularly adapted to be used in a vat of the kind described. Instead of the mineral wool, which is the principal non-conductor, equivalent non-conducting material may be used in the blocks, such as oak-bark or sawdust prepared with liquid glass; but the mineral wool is preferred, owing to its superior non-conducting property, and owing to its fineness of structure, which enables it to enter more freely into all parts of the blocks, also because it is absolutely fire-proof.

Having built up the tank from these blocks, as stated, I next line the inner as well as the outer side of the tank with a coat of cement, *b b*, which will prevent the escape of acids or pickling-liquids from the tank through the interstices between the blocks. Into two opposite upright walls of the tank I anchor T-bolts *d*, which extend through the upper ends of said walls, as indicated in Fig. 2, and serve to hold grooved rods *e*, of wood, that are fastened down upon the tank by means of nuts *f*, screwed upon the upper ends of the T-bolts, as shown. These nuts are sunk into the grooved wooden bars, as shown at the left-hand side of Fig. 2, and are afterward covered with cement, as shown at *g* at the right-hand side of Fig. 2, so that the acids contained in the pickling-liquids cannot affect the iron-work. In fact, by the construction shown all the iron-work is entirely out of reach of the liquids.

The grooved rods *e* have their grooves at the lower sides, as shown, so that they will serve as locks for the ends of a cross-bar, which holds the cover of the tank down upon the contents thereof.

I attach importance to this construction, because it enables me to properly lock the cover in place, and yet to remove and replace the wooden bars or rods whenever they are worn.

$h$ is a galvanized discharge-pipe, built into the lower part of the vat, for the purpose of withdrawing the liquid contents whenever desired.

I claim—

1. The composition for the block $a$, the same being made of Portland cement, coal-ashes, and mineral wool, substantially in the proportions specified.

2. The vat or tank, constructed of composition blocks $a$, and lined on the inner and outer sides with cement, substantially as specified.

3. The combination, in a tank built up of composition blocks $a$, of the T-bolts $d$, grooved rods $e$, and sunk nuts $f$, substantially as herein shown and described.

JOHANN HERMANN DREYER.

Witnesses:
 CHAS. KOSTER,
 T. B. MOSHER.